(12) United States Patent
Erasmus et al.

(10) Patent No.: US 12,041,099 B2
(45) Date of Patent: Jul. 16, 2024

(54) DATA MODELING FOR VIRTUAL COLLABORATION ENVIRONMENT

(71) Applicant: NCA Holding BV, Amsterdam (NL)

(72) Inventors: Daniel Erasmus, Amsterdam (NL); David Marvit, San Mateo, CA (US); Rein Brune, Somerset West (CA); Petrus Pelser, Langebaan (CA); Ian van Wyk, Somerset West (CA); Floris Fok, Amsterdam (NL)

(73) Assignee: NCA Holding BV, Amsterdam (NL)

( * ) Notice: Subject to any disclaimer, the term of this patent is extended or adjusted under 35 U.S.C. 154(b) by 0 days.

(21) Appl. No.: 17/950,011

(22) Filed: Sep. 21, 2022

(65) Prior Publication Data

US 2023/0094459 A1  Mar. 30, 2023

Related U.S. Application Data

(60) Provisional application No. 63/246,583, filed on Sep. 21, 2021.

(51) Int. Cl.
| | |
|---|---|
| *H04L 65/403* | (2022.01) |
| *G06F 3/01* | (2006.01) |
| *G06F 40/35* | (2020.01) |
| *G06Q 10/101* | (2023.01) |
| *G06T 19/00* | (2011.01) |

(Continued)

(52) U.S. Cl.
CPC .......... *H04L 65/4015* (2013.01); *G06F 3/011* (2013.01); *G06F 3/012* (2013.01); *G06F 3/013* (2013.01); *G06F 3/017* (2013.01); *G06F 40/35* (2020.01); *G06T 19/006* (2013.01); *H04L 65/403* (2013.01); *H04N 7/15* (2013.01); *G06Q 10/101* (2013.01); *G06T 2200/24* (2013.01); *G06T 2219/024* (2013.01)

(58) Field of Classification Search
CPC ... H04L 65/4015; H04L 65/403; G06F 3/012; G06F 3/013; G06F 3/017; G06F 40/35; G06F 3/011; G06T 19/006; G06T 2200/24; G06T 2219/024; G06Q 10/101; H04N 7/15

See application file for complete search history.

(56) References Cited

U.S. PATENT DOCUMENTS

| | | | |
|---|---|---|---|
| 11,252,205 B1 * | 2/2022 | Alwine | ................ H04L 65/403 |
| 11,354,490 B1 | 6/2022 | Shriver | |
| 2007/0299710 A1 | 12/2007 | Haveliwala | |

(Continued)

*Primary Examiner* — Mihir K Rayan

(57) ABSTRACT

An example may include identifying an initial context of a meeting based on one or more data inputs received from one or more participant devices operated by a plurality of meeting participants, querying remote data sources to identify one or more additional contexts associated with one or more of a specific period of time and a trending topic related to the initial context, forwarding a first of the one or more additional contexts to a first collaboration space of a virtual collaboration space, forwarding at least one additional context of the one or more additional contexts to a second collaboration space of the virtual collaboration space, identifying one or more sentiment actions associated with the one or more meeting participants, and overlaying the first collaboration space and the second collaboration space on an augmented reality display of a device based on the one or more sentiment actions.

20 Claims, 17 Drawing Sheets

(51) Int. Cl.
*H04L 65/401* (2022.01)
*H04N 7/15* (2006.01)

(56) References Cited

U.S. PATENT DOCUMENTS

| | | |
|---|---|---|
| 2008/0177708 A1 | 7/2008 | Ayyar et al. |
| 2009/0006982 A1 | 1/2009 | Curtis et al. |
| 2011/0055329 A1* | 3/2011 | Abt, Jr. ................. G06F 16/958 709/205 |
| 2011/0184983 A1 | 7/2011 | Kwantes et al. |
| 2011/0208522 A1* | 8/2011 | Pereg ...................... G06F 40/35 704/235 |
| 2013/0157234 A1 | 6/2013 | Gulli et al. |
| 2013/0293468 A1* | 11/2013 | Perez ...................... G06F 3/033 345/158 |
| 2013/0332450 A1* | 12/2013 | Castelli ............... G06F 16/3344 707/E17.046 |
| 2014/0049452 A1* | 2/2014 | Maltz .................. G02B 27/017 345/8 |
| 2016/0267071 A1 | 9/2016 | Castelli et al. |
| 2017/0344209 A1* | 11/2017 | Gordon ................... G06F 3/013 |
| 2020/0374146 A1 | 11/2020 | Chhabra et al. |
| 2021/0149980 A1 | 5/2021 | Pavlini et al. |
| 2021/0158458 A1 | 5/2021 | Waldrop et al. |
| 2021/0281802 A1* | 9/2021 | Kirisken ................. H04N 7/15 |
| 2023/0032753 A1* | 2/2023 | Swerdlow ............... G06F 40/30 |
| 2023/0164202 A1* | 5/2023 | Kumar Agrawal ... G06F 1/1686 348/14.03 |

\* cited by examiner

DATA MODELING FOR VIRTUAL COLLABORATION ENVIRONMENT

BACKGROUND

Meetings can be incidental or scheduled. A structured meeting requires planning, such as scheduling, live attendance by multiple participants, a specific meeting application or location, etc. In general, a meeting is a static event with no history of information other than what is shared by users in a live discussion.

Additionally, a meeting or simply just a collaboration may be flooded with information that no one user can generally corroborate or prove based on their own experience or knowledge, certain resources can be used to assist in this process, however, the information tend to be outside the scope of the meeting and is not available at the desired times.

A static two-dimensional space, such as a user interface is generally used to display one page of a presentation at a time during a collaboration session. This can bore the users in attendance and prohibit information flow from other sources to populate the display area of a computing device.

SUMMARY

One example embodiment may provide a method that includes one or more of receiving one or more data inputs from collaboration by one or more participant devices operated by a plurality of meeting participants of a meeting, identifying an initial context of the meeting based on the one or more data inputs, querying a databank of previously stored information to identify one or more additional contexts related to the initial context, linking the initial context and the one or more additional contexts by establishing one or more entity relationships, and forwarding the initial context and the one or more additional contexts as entities in a virtual collaboration space.

Another example embodiment may include an apparatus that includes a receiver configured to receive one or more data inputs from collaboration by one or more participant devices operated by a plurality of meeting participants of a meeting, and a processor configured to identify an initial context of the meeting based on the one or more data inputs, query a databank of previously stored information to identify one or more additional contexts related to the initial context, link the initial context and the one or more additional contexts by establishing one or more entity relationships, and forward the initial context and the one or more additional contexts as entities in a virtual collaboration space.

Still another example embodiment may include a non-transitory computer readable storage medium configured to store instructions that when executed cause a processor to perform receiving one or more data inputs from collaboration by one or more participant devices operated by a plurality of meeting participants of a meeting, identifying an initial context of the meeting based on the one or more data inputs, querying a databank of previously stored information to identify one or more additional contexts related to the initial context, linking the initial context and the one or more additional contexts by establishing one or more entity relationships, and forwarding the initial context and the one or more additional contexts as entities in a virtual collaboration space.

Yet another example embodiment may include a method that includes one or more of identifying an initial context of a meeting based on one or more data inputs received from one or more participant devices operated by a plurality of meeting participants, querying remote data sources to identify one or more additional contexts associated with one or more of a specific period of time and a trending topic related to the initial context, forwarding a first of the one or more additional contexts to a first collaboration space of a virtual collaboration space, forwarding at least one additional context of the one or more additional contexts to a second collaboration space of the virtual collaboration space, identifying one or more sentiment actions associated with the one or more meeting participants, and overlaying the first collaboration space and the second collaboration space on an augmented reality display of a device based on the one or more sentiment actions.

Still yet another example embodiment may include an apparatus that includes a processor configured to identify an initial context of a meeting based on one or more data inputs received from one or more participant devices operated by a plurality of meeting participants, query remote data sources to identify one or more additional contexts associated with one or more of a specific period of time and a trending topic related to the initial context, forward a first of the one or more additional contexts to a first collaboration space of a virtual collaboration space, forward at least one additional context of the one or more additional contexts to a second collaboration space of the virtual collaboration space, identify one or more sentiment actions associated with the one or more meeting participants, and overlay the first collaboration space and the second collaboration space on an augmented reality display of a device based on the one or more sentiment actions.

Another non-transitory computer readable storage medium configured to store instructions that when executed cause a processor to perform identifying an initial context of a meeting based on one or more data inputs received from one or more participant devices operated by a plurality of meeting participants, querying remote data sources to identify one or more additional contexts associated with one or more of a specific period of time and a trending topic related to the initial context, forwarding a first of the one or more additional contexts to a first collaboration space of a virtual collaboration space, forwarding at least one additional context of the one or more additional contexts to a second collaboration space of the virtual collaboration space, identifying one or more sentiment actions associated with the one or more meeting participants, and overlaying the first collaboration space and the second collaboration space on an augmented reality display of a device based on the one or more sentiment actions.

DETAILED DESCRIPTION

Figure 1:
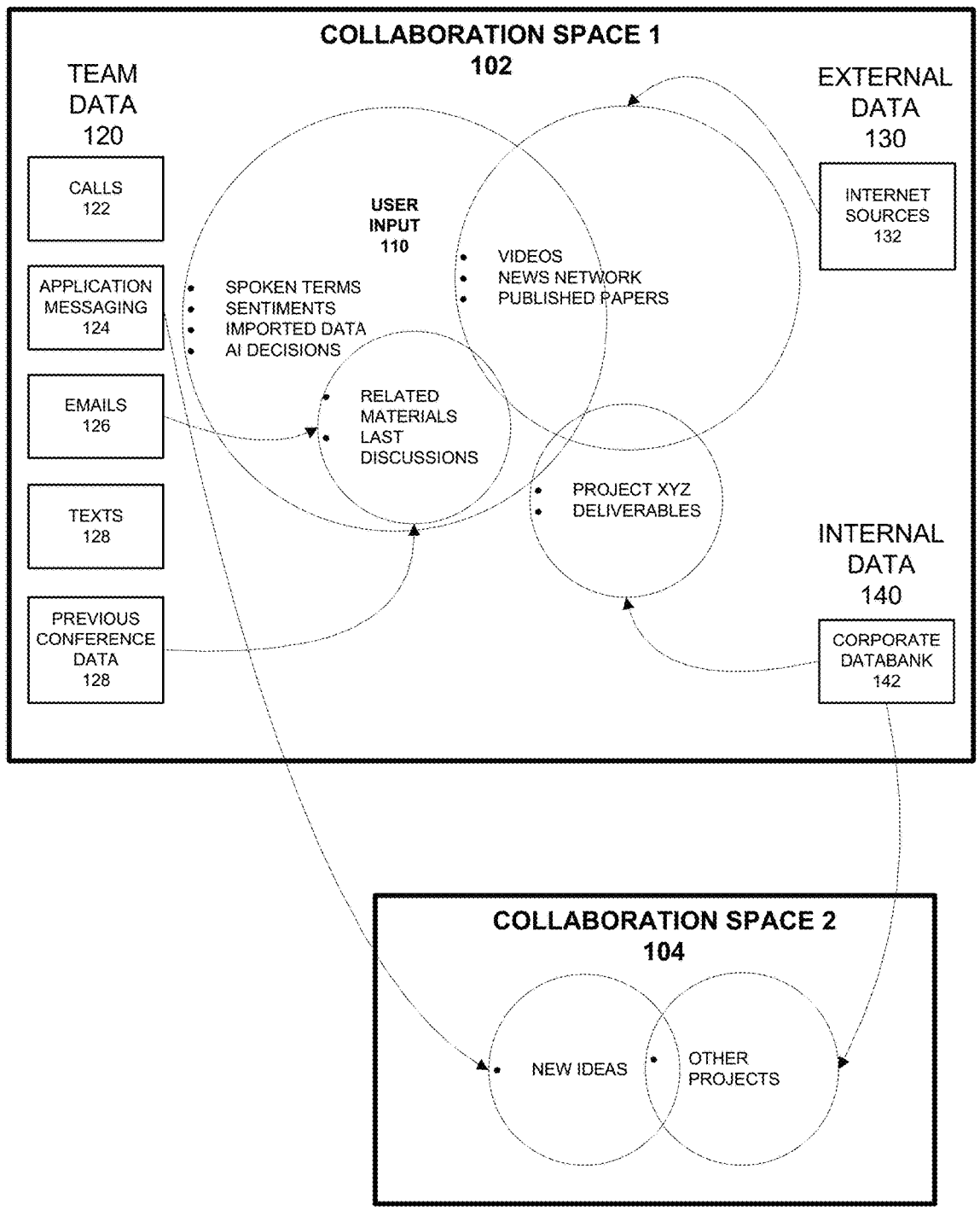
FIG. 1 illustrates a graphical user interface of example collaboration spaces according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Example embodiments include enhancing a meeting with dynamic data population procedures which may be shared with a meeting user interface or other computer related medium. The information shared may pertain to certain contextual information that is identified during the meeting as the attendees are present and sharing information. Not all information provided by the system application will be made available to all participants. The system application could use criteria, such as, confidentiality, expertise, or other factors, to make some information available (or even displayed) to some participants and not others. In one example, a meeting may have no pre-known purpose that can be identified by an artificial intelligence (AI) application utilized by the computer platform or by others, such as attendees (users) and their respective computer platforms, assuming the meeting is performed online and in remote locations. The purpose may be identified after the meeting has begun by using one or more information gathering and analyzation strategies. Also, a meeting may be based on synchronous (planned event times and/or locations) and asynchronous interactions (unplanned event times and spontaneous congregations of live attendees). Any user may begin sharing information with any other users or a recording platform of a computing device that is recording illustrations drawn on a computer, recording audio, video, etc. Once information is received and identified by the computing device, other information may be imported and saved in a common workspace (e.g., exported file, virtual whiteboard, virtual illustration, etc.). A meeting may also be a workshop, brainstorming session, lecture, question and answer session, and may be conducted via spoken words and/or shared text and drawings only. The meeting may also be performed by a VR device or in person.

One approach to automated importing and information collection may include a user's specific disposition, such as gestures of hands, head, face, eyes, etc. Any one or more of those input actions may be deemed as an approval, disapproval, trigger to import information, trigger to ignore information, etc. In operation, one example may include two or more live attendees which are talking and sharing information, such as a data file presentation, or other digital information, spoken words, input actions, etc. The meeting application may use AI to initiate one or more topics of interest. For example, a user may start the meeting by mentioning certain topics parsed from a phrase "global warming and other climate concerns are effecting countries all over the world, our task is to focus on flooding, farming and the general well being of those living in parts of central and western Africa." Such a phrase can be identified by the microphone enabled AI function of a computing device to launch an initial context. As the spoken phrase is recorded, the sentence information is parsed to enable an entity extraction (e.g., nouns, unique terms) and a neural network function to establish a relationship among the entities identified. This initial context may appear as one or more entities on a virtual whiteboard all users can view on their conferencing devices. The entities in this example may be "global warming", "Africa", "western Africa", "extreme weather", etc.

Once the initial context is identified, the content that is shared may be based on current and/or previous information stored in a databank. The databank may be based on information stored in an internal database that is assigned to the conference application. For example, the application may be configured to use information shared among users of an organization, the e-mails, text messages, data files and other information of those users may be stored in the databank as such information pertains to the corporation or other entity which is hosting the information storage. Preferences may be used to limit, include, prioritize, deprioritize or include additional information sources. For instance, a preference to include corporation XYZ information from e-mails, files and folder directories may be initiated by certain users attempting to create new collaboration efforts. Other information sources, such as text messages and other data sources may be omitted per user preferences. Inclusion of still other information sources may be deprioritized based upon a cost (i.e., economic or otherwise) of their use.

Content of a meeting may include user opinions, document collections, social media posts/interactions, avatar representative messages of attendees or groups of attendees, as well as artificial intelligence representing people, opinions, institutional goals, other goals, outcomes, predictions. The artificial intelligences representing non-human actors may include legal systems, collections of legal systems, city ordinances, country ordinances, alliances. AI using deep learning and other techniques may be trained on the laws or legal framework of a country, an alliance could provide an assessment on the legality of certain suggested actions during the meeting. The AI could provide recommendations, visual feedback, multi-dimensional feedback or other representations/syntheses of scientific articles, which are deemed relevant and retrieved responsive to conversations in a meeting, and the AI could correct conversations or contribute to conversations based on its understanding of "truth" or weighted opinion extracted from, but not limited to structured datasets, averages taken across multiple news sources, personal documents on a hard drive, cloud service, browsing history and/or transcribed conversations among other people/AI or collections of documents, such as but not limited to academic journals, news, writings by authors, notes from a person, generated text from artificial intelligences based on features extracted from document collections but not limited to the collections. Scores could be produced as well to establish a fundamental weight or value that users may find helpful to establish validity of AI produced information. Similarly, the AI could estimate a cost of various proposed courses of action, including estimating the utilization levels of various types of resources. This information could be shared upon request, volunteered, or inserted based upon an estimate of its impact on the topic under discussion. Also, agendas and calendars could further provide potential meeting content.

Once a meeting is identified by the AI process of the meeting application, the 'driving element' that causes additional actions to be taken may include using key phrases, such as phrases which imply a work process, such as, but not limited to "follow-up", "next steps", "progress", "update", "review", and/or "second demo", etc. or equivalents in other languages. Each meeting may be referred to as a workstream or may just be part of a larger concept workstream. The workstreams may be stored in a workstream database and mapped or linked together over time based on the entity relationships identified (e.g., similar topics of interest). Workstreams may join and/or branch, hibernate and revive. The status of a meeting as part of a workstream may change over time as the course of events and future meetings and workstreams evolves to include new information and to remove old information. In a virtual reality (VR) and/or an augmented reality (AR) environment each real-world geographical location with detectable surfaces can become a unique environment for VR/AR information overlay, this turns a multi-level/room meeting environment into a canvas for information presentation. An ID can be attached to a geo-tag to identify content at certain locations in one or more collaboration spaces. The most common tags and criteria for distinguishing one collaboration space from another includes time, topics, members, key phrases, Notes, themes, Item links, etc. The correlation between collaboration spaces may be large, minimal or non-existent.

Content shared within a meeting/collaboration may include identifying current input, such as spoken words at the start of a meeting and comparing text, network graphs, and other measures generated during a meeting versus text generated during current and earlier meetings to see a correlation coefficient (CC) between sequential meetings or even non-sequential meetings. There may be many different correlation coefficients for a meeting, each representing an attribute, or attributes, of interest. This CC will be a value, normalized 0 to 1, but could be represented in other ways and displayed on a time-based graph, histogram, scatterplot, spider diagram, or other representation. CCs could be combined into a correlation vector representing correlations across may dimensions. The results will indicate if meetings are off-topic, on-topic, creative, converging, diverging, functional/non-functional conflict, and making progress.

The system application could also be used for personal workflows not just "meetings", such as note taking, personal knowledge organization and retrieval, idea exploration or generation, journaling, etc. This may include training environments which may include using AR for training and skill transfer. A meeting may be replayed. There may be a procedure to compare and/or contrast the output generated by different sessions. If two different groups discuss the same topic, the meetings may be identified as different or the same. The visualization may be 3D, 4D, VR, and AR, this may also include 1D and 2D.

The driving factors to expand and increase the content of a collaboration space may be based on the members'/users' actions. Analysis of gestures, body movement, tone of voice, etc., can be detected by the AI application to generate a more accurate assessment of suitable and non-suitable content. Also, the presentation layout may be based on user approval or disapproval which can be inferred from user sentiment (e.g., gestures, movements, tone, etc.). Ideally, a cluster view of all key meeting concepts/initial contexts of the current and all related previous meetings can be retrieved, displayed and relationships can be illustrated (e.g., connections, lines, Venn diagrams, etc.) to demonstrate relatedness among the contexts. As the meeting or conversation develops, the cluster graph or contextual information visualization can update (continuously or discontinuously) to include new topics or append and integrate new data points as expansions of existing topics.

Adjacent or relevant information from past conversations may be highlighted and placed on the display of a user device and updated in real time based on content received during a live meeting. Semantic knowledge items can be displayed for an entity to include linked data and highlighted items that are not contained/identified in an original cluster. Various sources may be linked to external sources such as GOOGLE drive, iCloud, articles, publications, etc., to build onto a single topic cluster and expose information with various sources.

Interactive search or persistent search results may be displayed to include document collections in a 3D cluster map or context graph that can be rendered and displayed in a real or virtual 3D space or could be mapped to real world or virtual objects including but not limited to surfaces and walls. A $4^{th}$-dimension can be introduced that can be navigated with a similar interface. A simple non-limiting example would be a 3D cluster map of news. One could, possibly by using gestures or an interface slider, or voice, or some other approach, have the 3D cluster map change to reflect how the news varied over time as the $4^{th}$ dimension.

As a non-limiting example a context graph can be triggered by a predefined statement such as "show me . . . " or other statements made by a user, or by an imaging camera device in an augmented reality display (e.g., smart glasses), or computer camera of a person or persons looking up/down, left/right, to display the graph the context graph, etc., interaction may be performed via voice, mouse movement of the person, movement of another device, moving parts of the body (e.g., hands, fingers, eyes, winks, nods, facial expressions, etc.).

FIG. 1 illustrates a graphical user interface of example collaboration spaces according to example embodiments. Referring to FIG. 1, the example collaboration space(s) 100 may include a first collaboration space 102 with various core subjects including an initial context that is detected by a conference or collaboration application. The participating users may be using a mobile device, a computer/laptop and/or other peripheral devices, such as a smart watch, smart glasses, a virtual reality device, or other computing device. As the discussions are shared among the active meeting participants, an initial user input portion 110 may be populated with certain topics extracted from the spoken words, sentiments (e.g., gestures, body movements, facial movements, etc.) provided by the users. Also, the AI engine which may be part of the application may interpret keywords and phrases form the input and provide examples of topics and related subject matter.

In the example of "Africa", and more specifically, "Kenya" and "extreme weather" or "global warming", the topics may quickly be laid out on a display as circles and other entities which may be linked together by arrows, lines, and other linking indicia. The main sources of information may include team data 120, which is an established set of user data, such as enterprise or corporate environment data that is initially available by all users to include but not limited to e-mail data 126, transcribed phone calls 122, application messaging 124 (e.g., social media accounts, collaboration tools (e.g., SLACK, WHATSAPP), text messages 128 (e.g., SMS messaging), previous conference data 128 stored and saved by the application. As may be observed all such resources may be accessed and linked to the user input as new sources. Overlap of information can be identified by Venn style diagrams, links, timelines, and other indicia to demonstrate relatedness among the information. User sentiment can be tracked to confirm and deny certain data entries and their arrangement along a particular collaboration space.

In addition, the specific team resources 120, there may be invocation of external data sources 132 from trusted data sources across the Internet, such as periodicals, journals, universities, government sites, etc. The more common or trusted a site, the more likely the site is to be suggested or used autonomously by the AI application to invoke additional information. A site that is always identified by positive user sentiment may be included with a full weight score, such as 5 out of 5, 10 out of 10, etc., sites where the users normally provide positive sentiment may be scored lower, such as 4 out of 5 or 8/9 out of 10, and so on. Sentiment may be a simple nod of the head, blink of the eyes or a spoken term or phrase, like "yes", "no way", etc. The gesture types of sentiment may be detected by a device's sensory features, such as motion detection, sound detection, etc., by a peripheral device, such as smart glasses or by a handheld device with such sensors. Another source of information may be wider corporate databank 140, which may include corporate information sources 142 which are beyond the scope of a particular team or group but still inside a corporate entity, such as other teams or locations for a common enterprise.

In one example, a second or additional collaboration spaces may occur. The decision to end one collaboration space or begin another, such as collaboration space '2' 104 is based on the information organization performed by one or more users of a collaboration. For example, a new topic that is not considered previously related to another topic may cause a new collaboration space. Time may be used as a basis to create a new collaboration space, as well as a new member sharing a new topic or a previously discussed topic. Entity relationships may be created between collaboration spaces, however, the momentum of information sharing is likely to have shifted to a different area of collaboration to invoke a new collaboration space. Collaboration spaces with new information, or considered of greatest relevance to the discussion, may be highlighted in various ways. Similarly, those considered less relevant can be "anti-highlighted" (dimmed, made lower contrast or even transparent etc.).

Figure 2A:
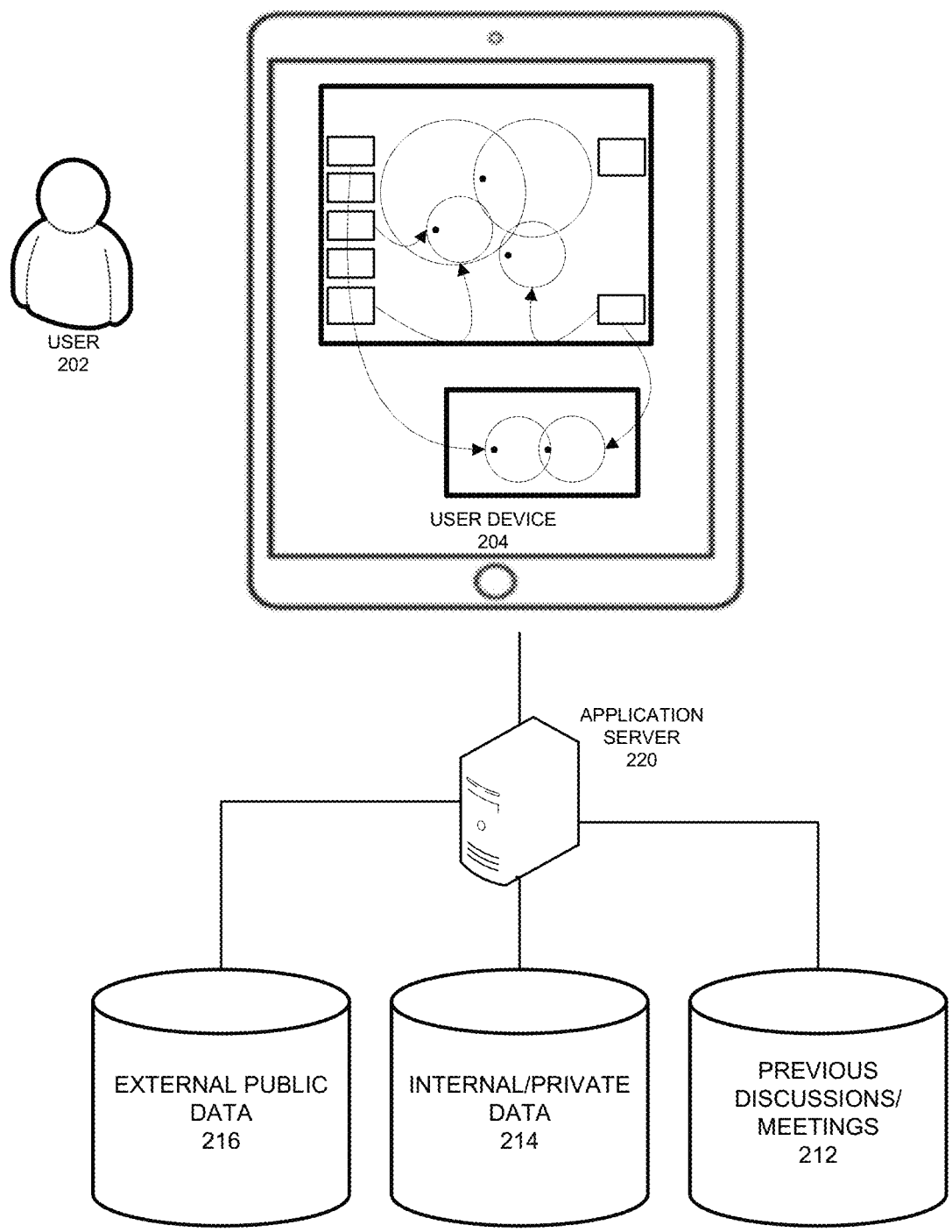
FIG. 2A illustrates network diagram of the example collaboration spaces being populated with data by remote data sources according to example embodiments.

FIG. 2A illustrates network diagram of the example collaboration spaces being populated with data by remote data sources according to example embodiments. Referring to FIG. 2A, the example 200 includes a user 202 that is using a user device 204 to follow along with a collaboration space. The gestures, sentiment, spoken input and other information shared by the user 202 may 'drive' the meeting forward with topics, graphs, entities, relationships, etc., depending on where the discussion is identified at a particular time, such as an initial context, and where the discussion is going based on other topics, suggestions by other members, predictions made by the AI, etc., which can all be shared on the collaboration space. An application server 220 may be a cloud-based server that is applying the AI application to the meeting. The meeting may be started by a simple access operation of accessing the collaboration application and initiating a topic discussion. Other users may join the meeting at any time or at a later time and share other topics, sentiment and requests for further discussions. Requested data may be a topic part of the collaboration or may invoke a new collaboration space. Information may be collected from previous meetings and discussions 212, internal/private data 214 and/or from external public data sources 216.

Figure 2B:
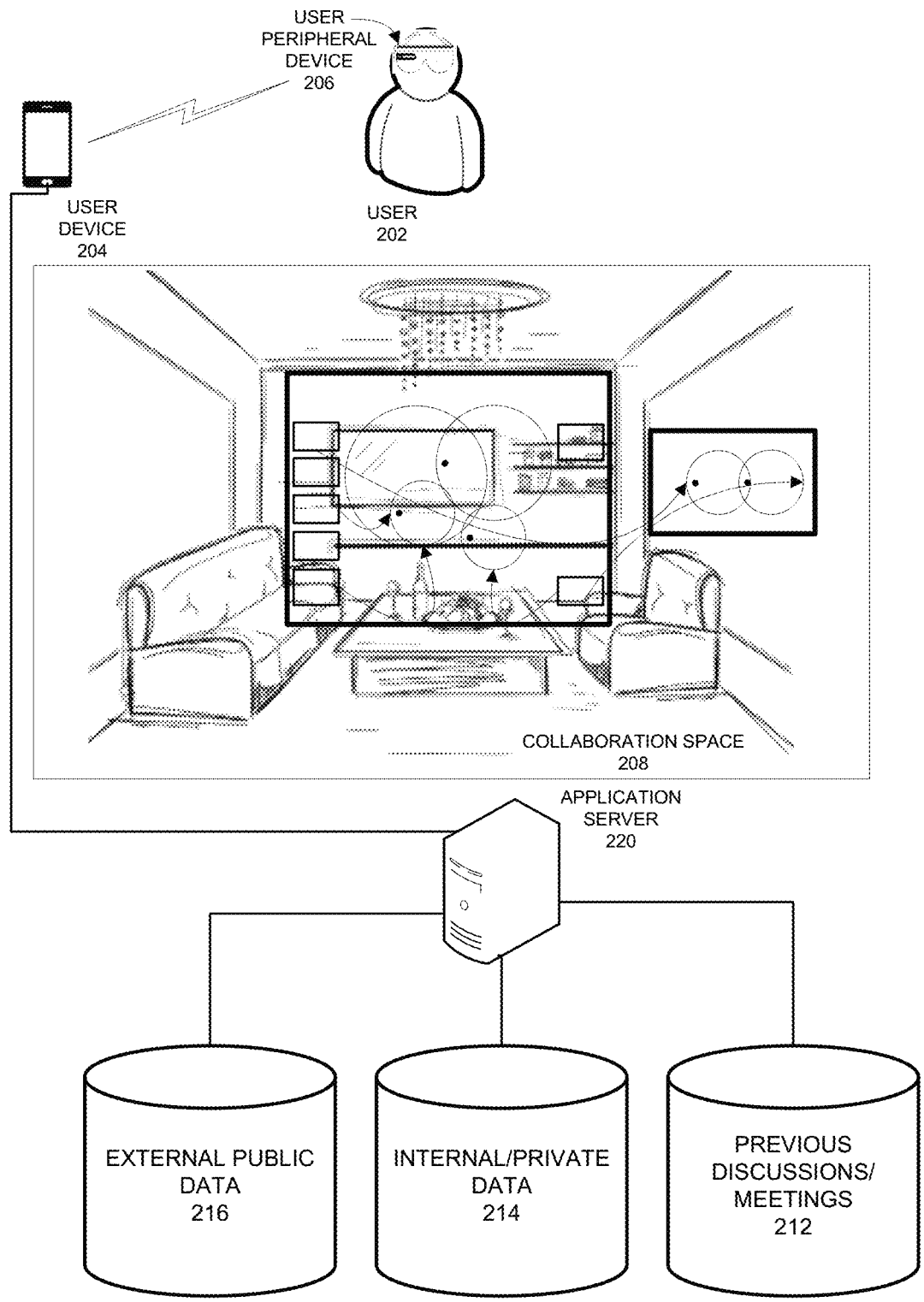
FIG. 2B illustrates example collaboration spaces being included on a virtual space for an augmented reality (AR) according to example embodiments.

FIG. 2B illustrates example collaboration spaces being included on a virtual space for an augmented reality (AR) according to example embodiments. Referring to FIG. 2B, the example 250 demonstrates a view of an augmented reality space which is controlled by a user device 204 communicating with a server 220 and/or a user worn peripheral 206, such as smart glasses which provide a projection of a computer display on the glasses worn by the user. The arrangement of information, such as the collaboration space 208 may be based on user sentiment and actions detected by the peripheral device (smart glasses) 206. A user may walk around a room and see collaboration spaces in any arrangement desired. A user may also explicitly move and resize the collaboration spaces through voice, gesture, peripherals, affordances on the collaboration spaces, or other forms of explicit commands.

Figure 3A:
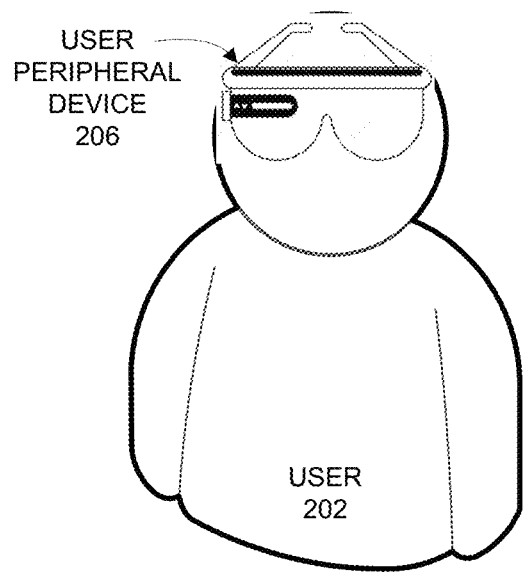
FIG. 3A illustrates an example user operating a peripheral device according to example embodiments.

FIG. 3A illustrates an example user operating a peripheral device according to example embodiments. Referring to FIG. 3A, the use 202 may be wearing a sentiment detecting peripheral device 206, such as smart glasses or other devices which have detection capabilities, a memory and a processor. The device may be powered on and ready for user action detection as well as projection capabilities which share a visual display of information, such as an ongoing meeting including a collaboration space of information.

Figure 3B:
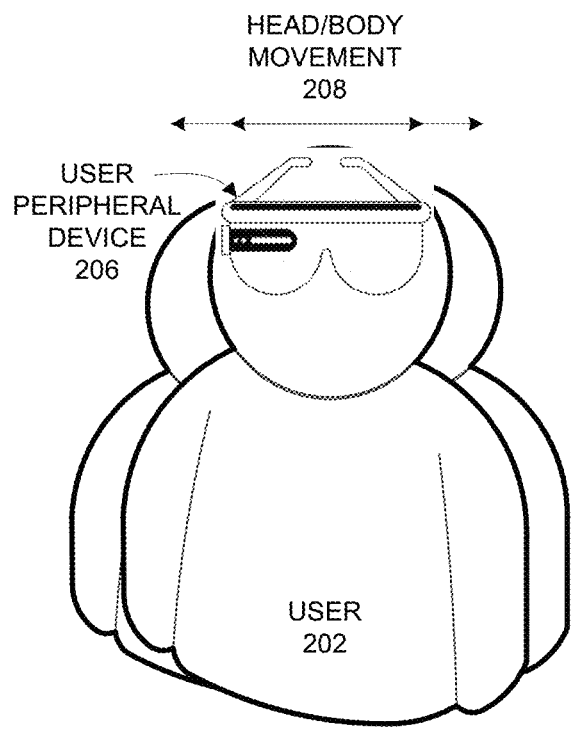
FIG. 3B illustrates an example user body action that provides sentiment to a detection feature of the peripheral device according to example embodiments.

FIG. 3B illustrates an example user body action that provides sentiment to a detection feature of the peripheral device according to example embodiments. Referring to FIG. 3B, the user 202 may begin shaking their head, moving their body, arms, legs, etc., to indicate an approval/disapproval of information context and information commitment to the collaboration. The information may come as a queue or list of information that is selected and admitted to the collaboration or dismissed from the collaboration pending a user sentiment towards the information. Also, the placement of the information may be performed by the user sentiment/actions performed. For example, a new topic or network entity may appear in an area the user is facing and the user may shake his/her head to dismiss the topic or move it to another area. Similarly, the user may make a positive sentiment to include information which is automatically identified by the AI application as a potentially valid context.

Figure 3C:
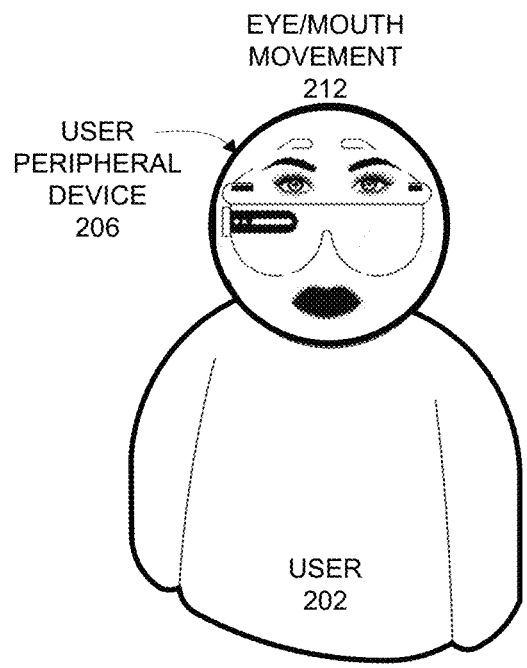
FIG. 3C illustrates an example user facial action detection feature of the peripheral device according to example embodiments.
Figure 3D:
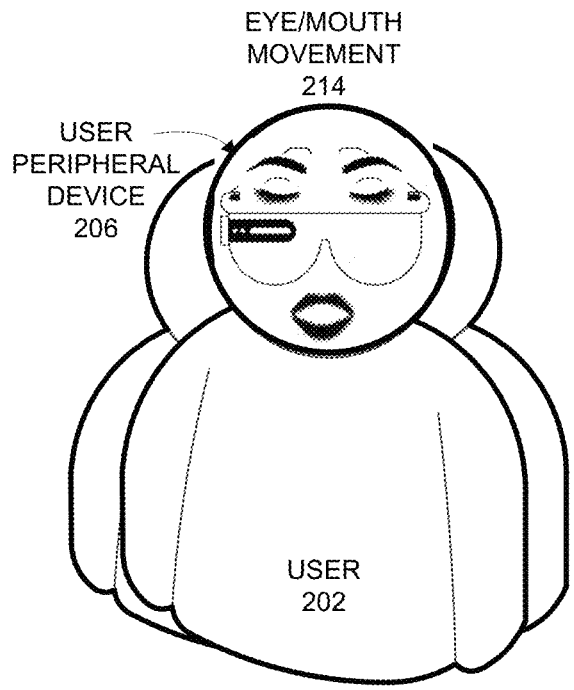
FIG. 3D illustrates an example user facial action that provides sentiment to the detection feature of the peripheral device according to example embodiments.

FIG. 3C illustrates an example user facial action detection feature of the peripheral device according to example embodiments. Referring to FIG. 3C, the user 202 may be accepting, rejecting, moving, storing, etc., information by a simple eye and/or mouth movement 212 or a lack thereof. FIG. 3D illustrates an example user facial action that provides sentiment to the detection feature of the peripheral device according to example embodiments. For example, the eyes or mouth may shift, be opened, closed 214 for a period of time and may be detected as a command to control the information on the collaboration space.

Figure 4:
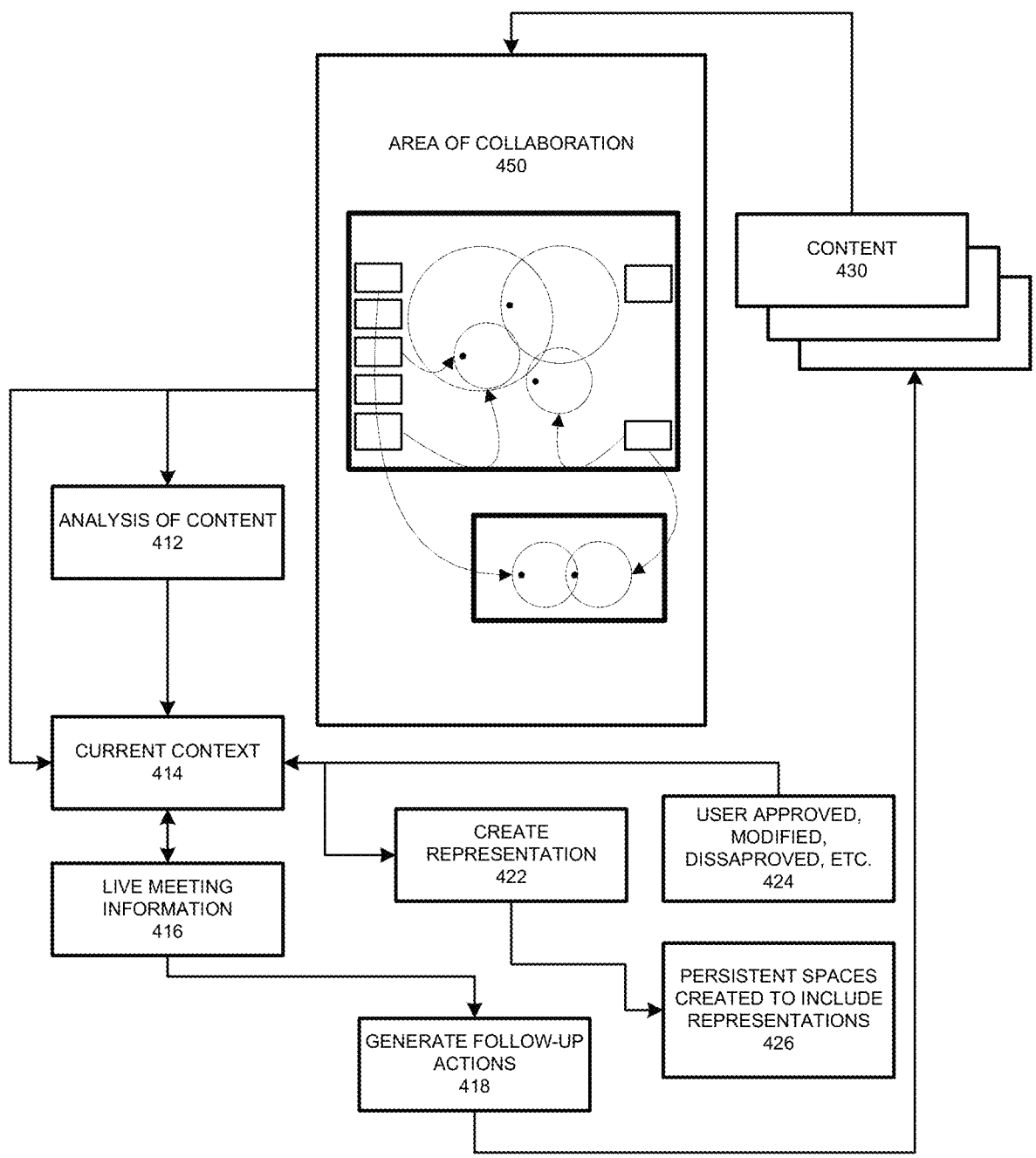
FIG. 4 illustrates an example logic diagram for managing content in a virtual collaboration area according to example embodiments.

FIG. 4 illustrates an example logic diagram for managing content in a virtual collaboration area according to example embodiments. Referring to FIG. 4, the area of collaboration 450 may be based on a series of operations. The content of the collaboration space is a dynamic and recursive process that depends partially on the user interactions and partially on the AI used to access and reference various information sources. The content that is present in the collaboration space may be analyzed 412 to identify a current context 414. The content may be adjusted dynamically as the discussion progresses into different topics and areas of interest. The body language (i.e., sentiment or tone) of the users is incorporated into the process as non-textual information. The current context 414 can be used to create a representation 422 pending user approval 424 of the representation. The proposed new entity or suggested content may be presented by the AI depending on user settings and the users can permit/deny the representations. The spaces that are created may include certain representations 426. Content of the meeting 416 is used to also generate follow-up 418 or new questions and suggestions for additional content. The actions may include visual representations which should be explored at a later time. As the content 430 is retrieved from various sources it may be provided to the area of collaboration 450 in the form of entities and relationships so a user can navigate the area to identify areas of interest to explore and expand.

Figure 5A:
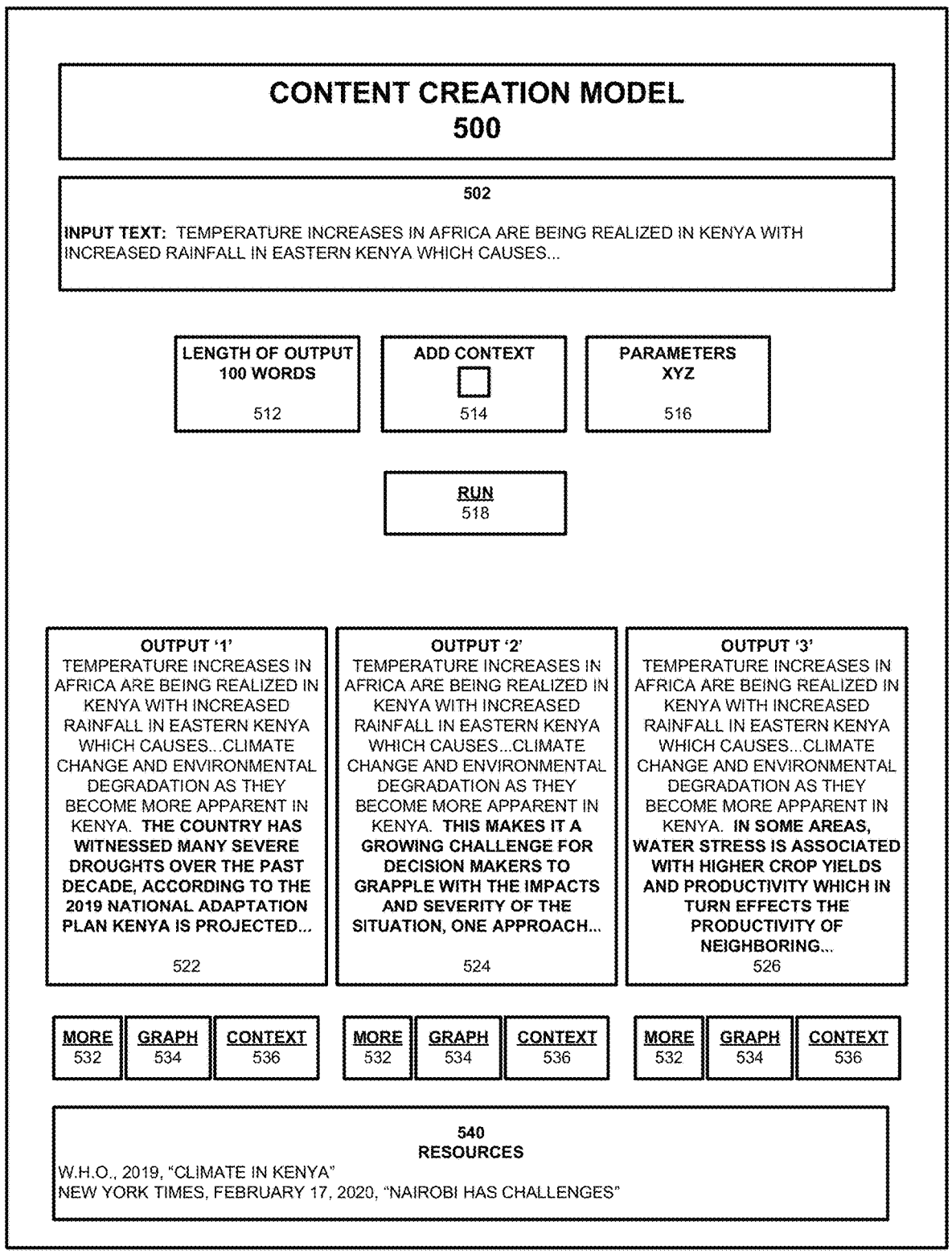
FIG. 5A illustrates an example multi-response content creation configuration user interface according to example embodiments.

FIG. 5A illustrates an example multi-response content creation configuration user interface according to example embodiments. Referring to FIG. 5A, this example includes a content creation model 500 as a user interface to permit input information 502, such as text, spoken words and/or document information to be extracted and used to generate multiple outputs 522-526. As the input is received, prior to the query and multiple different outputs being generated, the length 512 of the output may be specified along with the option to add a particular context 514 to assist with the scope of the output, and certain parameters 516 can be included as well prior to initiating a "run" operation 518. As the outputs 522, 524 and 526 are generated, the content may vary depending on the initial contexts identified and the constraints of the search effort. The user may select options, such as more 532 to explore additional content, graph 534 to observe an analytical view of the content and context 536 to identify the basis of the search results. As may be observed, the content of each output will vary and may include different contexts, sources and analysis procedures to achieve the separate outputs. The user may be presented with a visualization of the outputs to determine which content to keep in a visual collaboration space and which content to discard. Resources used to achieve the content may also be presented 540 to identify the sources used to generate the content.

Figure 5B:
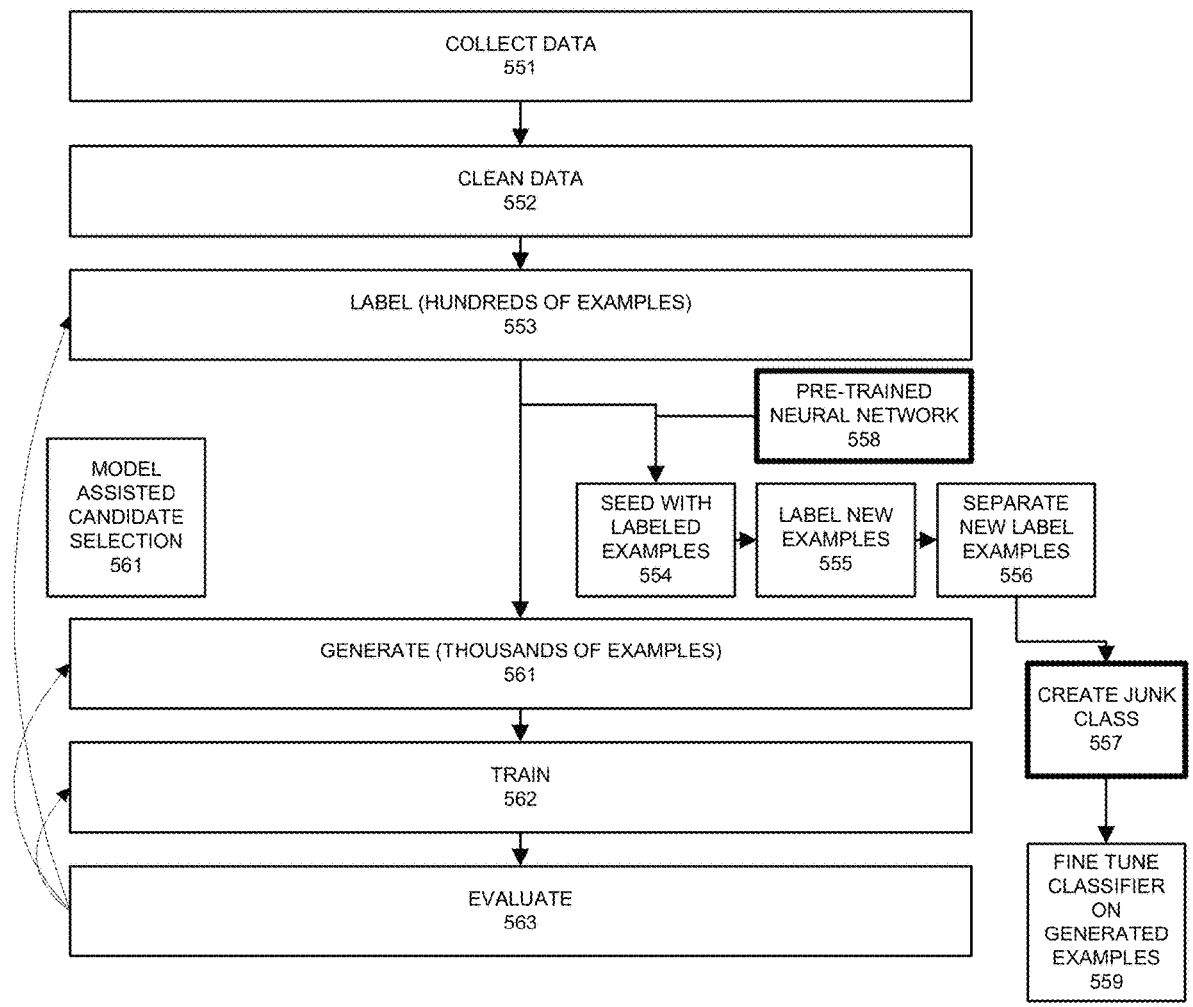
FIG. 5B illustrates an example data management process for performing generative labeling according to example embodiments.

FIG. 5B illustrates an example data management process for performing generative labeling according to example embodiments. Referring to FIG. 5B, the process may include collecting large blocks of data as input (words, phrases, images) 551, cleaning the data 552 (e.g., parsing, word selection, tagging, tagging images, etc.). For example, input may include web-based news data or other sources and data relationships may be identified between two topics, such as 'China' and 'Africa'. Content may include past conversations, media, in-person/in-meeting, time stamped data, etc. The data cleaning may include parsing the data to identify verbs and nouns and links between words, such as established relationships. In one example, a website may be cleaned to only include text, and labels, and other data, such as links and advertisements are removed.

The process of labeling examples may include identifying hundreds of examples 553 to label, such as a sentence, paragraph or document level example and build labels to identify specific relevancy. Classes (topics) can be identified and labeled. Signals may be a term to use for signaling whether content of a piece of text of any length is connected to one of the projects being processed. For example, 'climate risk' is a label that can be identified as having increased in 'farming communities in Ghana', and 'climate risk' may be identified as having decreased in 'Kenya'. Classes are the basis for labels, and sentiments or direction can also be identified, as (very) positive or (very) negative attributes of a label. All statements are established for some sort of class. The pre-trained neural network 558, may be trained on a large collection of text which can be filtered to suite the objective by fine tuning the model with collected data and labeling keyword matched examples. The content can be separated into junk and non-junk and newly labeled data may be fine-tuned for a new model or classifier (i.e., data scaling) may introduce randomness to the seeded/example labels 554 to generate a new labeled example 555 which can be fine-tuned 559 based on some specific criteria. Also, a junk class 557 can be used to establish criteria that is not valid or is not part of the classes used. The data may be cleaned and deduplication may be used to sift through the data to remove highly similar or same documents.

The pre-trained neural network 558 may be trained on predicting based on seeding numbers, sentences, etc. For example, a large collection of text can be used to predict a next word/next sentence, a large collections of images can be used to match images with descriptions, a large collections of images can be used to match images with temporal sequences (i.e., satellite picture taken every day of a jungle, picture taken of a city every day, increasing defects in lithography or manufacturing processes, etc.). A large collection of temporal numerical sequences (i.e., stock market prices, what prices are next, etc.). A large collection of temporal numerical sequences can be linked to text (i.e., stock market prices linked to news to identify what prices are next and how news can predict stock market prices, etc.). A large collections of temporal audio sequences linked to transcribed text can be used to predict a next sound or word. A large collections of video sequences from AR/VR devices, cameras, can be used to identify what will uses look at next, what will be focused on, what objects are in the images.

The classes in this example may include 'Kenya', 'Ghana' and other African countries, along with 'climate risk' in 'Africa', 'society', 'governance', 'China', 'Company XYZ', problems among the entities, etc. Many words, sentences, etc., are used in training and to take a seed, which may include a sentence, and finish content of that sentence. One example would be a sentence that has to do with "climate risk". Labeling may be performed first, then seeding with labeled examples to separate new labels 556 which can be used with the junk class 557 when fine tuning the classifier on the generated examples 559. This can also be performed with images, to identify elements of an image, a pedestrian, a traffic cone, a car, a defect in manufacturing, a defect in photolithography, etc.). For example, identifying a defect in a MRI scan, or some detailed document to demonstrate an error or to identify the data being examined. VR glasses can be used to demonstrate an AR of what a user is seeing. An optical scanner, sonogram, or other scanner can be used to identify quality of manufacturing, or defects in the images. A set of labeled/classified documents can be combined with large neural networks to produce synthetic training data.

The junk class 557 is not applicable data, so the content that is removed can be used to increase relevancy as examples are created 561 and trained 562 during an evaluation procedure 563. In one example, there are three classes, increasing, decreasing, and junk. In addition, this allows for more data to flow through the system of examples 561. The examples can be created and expanded then be used as exclusion once it is expanded upon. The randomness may be introduced as a random number generator, the 'temperature' is modified by changing 'weights' of the neural network 558 and moving them in different directions, the neural network weights (e.g., 10, 10.1, 10.2, 9.9, etc.) creates inputs and outputs which can be modified. The neural network may include various layers (i.e., 7 layers), and the relationships are modified based on the weights. Generating new labeled examples provides new training examples, which can be fine-tuned to modify the classifier and generate artificial examples. The junk class 557 can provide exclusion criteria to further optimize the data results. The accuracy percentage results can be obtained by performing training on half of the results and testing on the other half of the results and comparing them to determine a percentage of accuracy. The model assisted candidate selection 561 can implement a model of examples to provide a candidate selection.

Figure 5C:
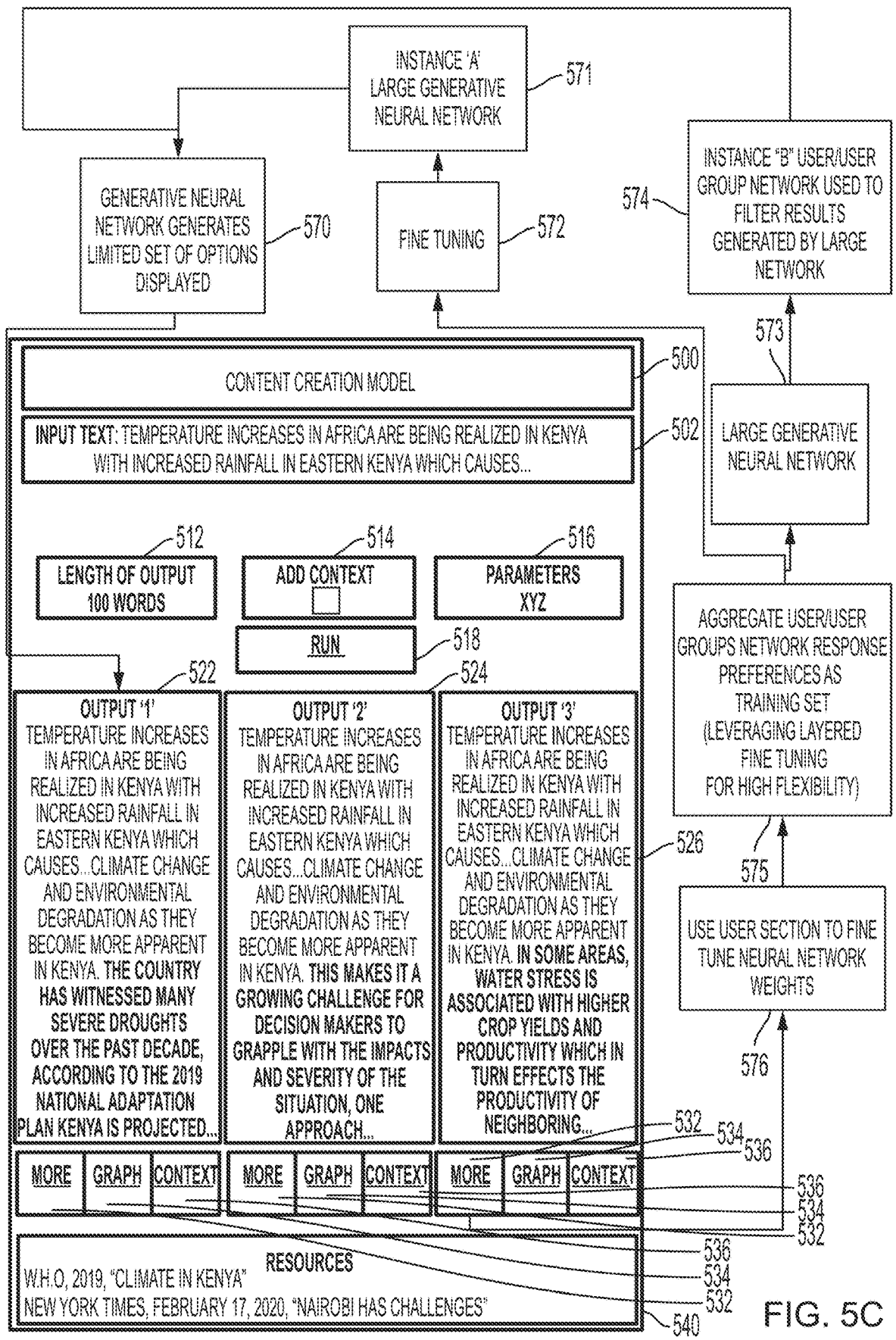
FIG. 5C illustrates an example data management process for using a generative neural network to provide content creation for textual data according to example embodiments.

FIG. 5C illustrates an example data management process for using a generative neural network to provide content creation for textual data according to example embodiments. Referring to FIG. 5C, the textual data from the content creation model 500 may provide certain data results based on a generative neural network which generates a limited set of options based on inclusion of randomness to display to a user interface 570. A first instance 'A' 571 may include a large generative neural network 571 that is fine tuned 572 and includes an aggregate of user/user groups network response preferences as a training set 575 that can be used to train networks/fin tune models and large neural networks customized by modifying responses to input and also including exclusion criteria. This may also provide a large generative neural network 573 of data. The second instance 'B' may provide a user group network used to filter results generated by a large network 574. Both instances provide relevant information to a user interface. Content may be fine tuned in the neural network by weights to build a network that is fine-tuned 576 to a user or group of user preferences to provide feedback to a user with newly generated network results. This can be applied to text, images, video, sounds, graphs, etc. This can also be used for removing bias from generative models trained on unsupervised text, for example, such as gender bias can be identified, removed and revised by providing more appropriate answers as a response.

Figure 5D:
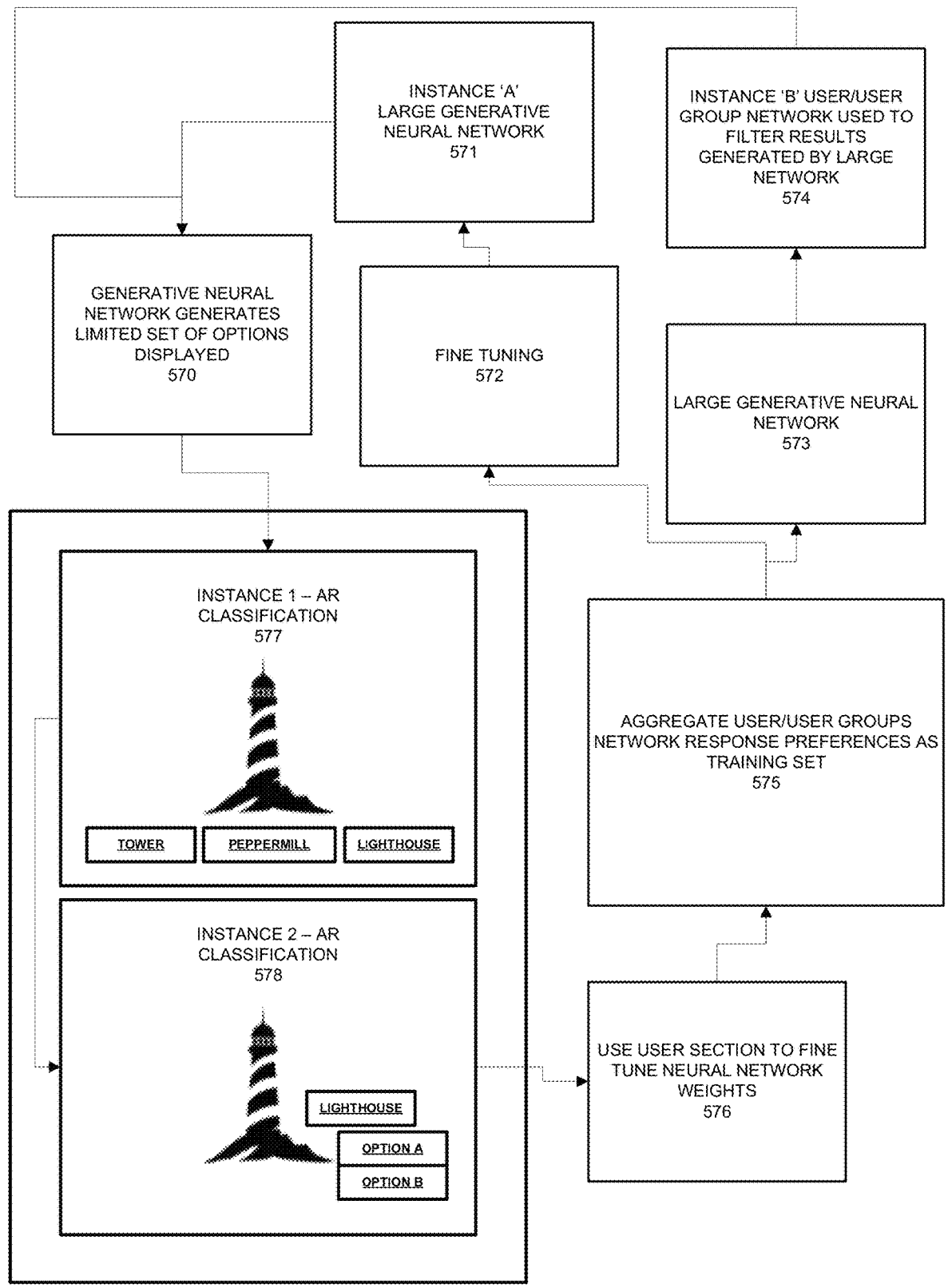
FIG. 5D illustrates an example data management process for using a generative neural network to provide content creation for image data according to example embodiments.

FIG. 5D illustrates an example data management process for using a generative neural network to provide content creation for image data according to example embodiments. Referring to FIG. 5D, the example includes image data 577 that is identified as including one or more potential types of content. The example is identified in the first instance as a lighthouse 577 and in the second instance 578 as one or more options A/B. The image content may be processed by the neural network list of options generated 570 to display a most likely classification for image content with an option for a user to reclassify the content based on a trigger (icon, voice, command, etc.).

Figure 5E:
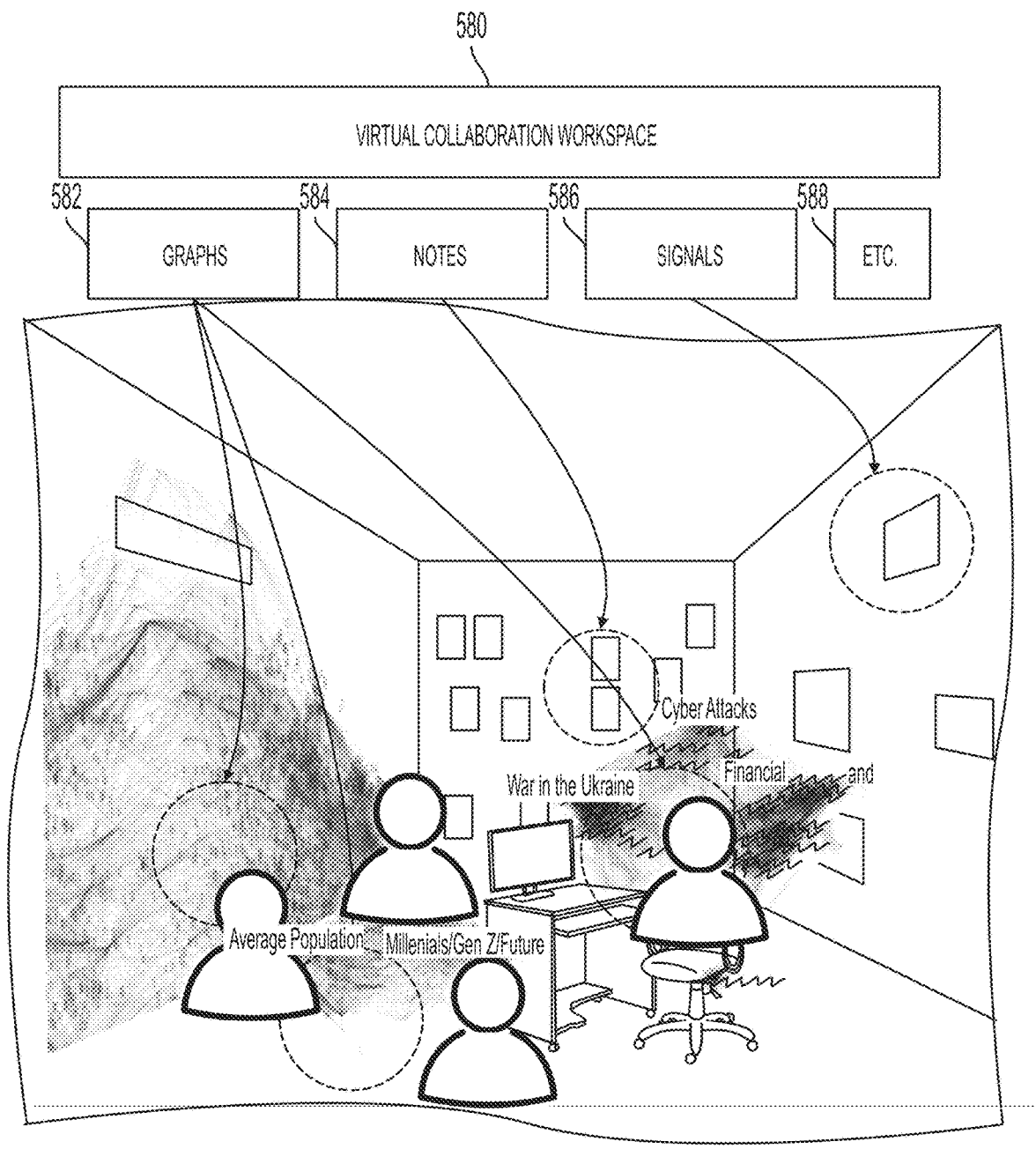
FIG. 5E illustrates an example data realization in a virtual AR workspace among multiple users according to example embodiments.

FIG. 5E illustrates an example data realization in a virtual AR workspace among multiple users according to example embodiments. Referring to FIG. 5E, the virtual AR collaboration workspace example 580 may provide one or more users with the capability to view (with the proper periphery devices) virtual information around a particular environment, such as a room. Each of the elements are interactive and can include user commands (voice, gesture, etc.) or changed by AI based on a non-limiting example analysis of the discussion, presentation, typology of the meeting (e.g., brainstorming, problem solving, covering, strategy, etc.). The first visualization example 582 may be a graph with concepts extracted out of a corpora of data which may be based on conversations or other data sources. The data may be part of a team of collaboration data and may be formatted as part of the world at large. The graph can be 2D, 3D, 4D and may be an AR data realization that can be manipulated to identify relationships among classes of information including topics, relationships, time, etc. In another example, notes 584 may be placed on a 'virtual wall' to include core concepts extracted from a meeting. The notes can be arranged from brainstorming sessions and may include critical flow charts. The other example may include signals of information 586 overlaid on top of virtual indexes that provide an active overview of indicators on a dashboard, or other information 588. The collaboration may include a number of users with VR/AR peripheral devices used to visualize the data which is arranged dynamically around the virtual workspace. The VR/AR can offer a way to create multiple rooms and 'spaces', such as a project building with brainstorming space, such as a 3D-mock-up of a car, prototypes, etc.

Figure 5F:
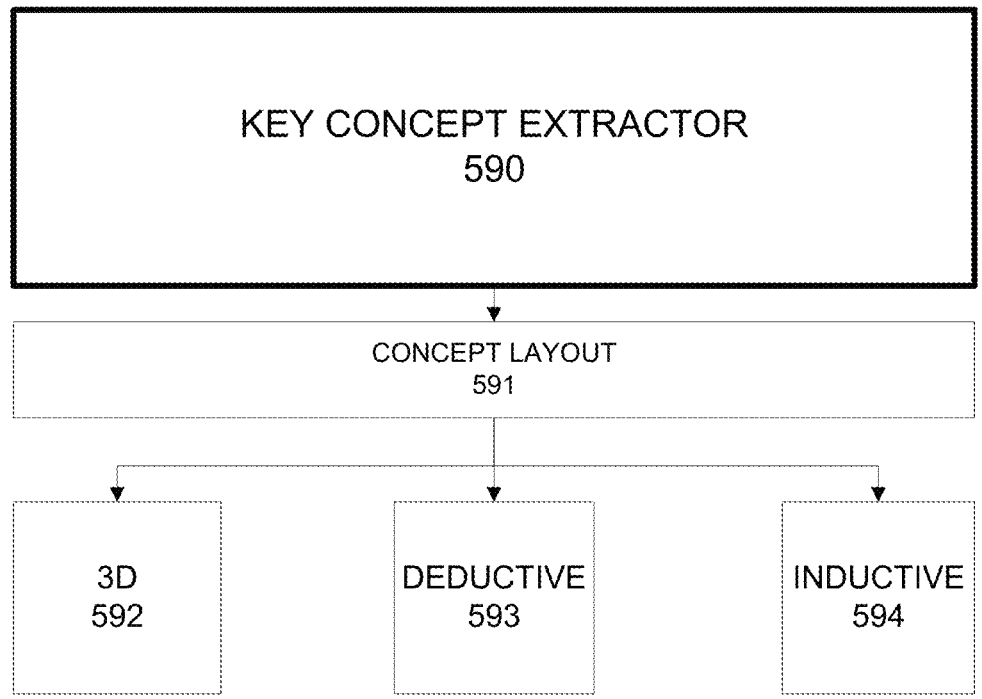
FIG. 5F illustrates an example data concept extractor process used to generate various different types of visual output models according to example embodiments.

FIG. 5F illustrates an example data concept extractor process used to generate various different types of visual output models according to example embodiments. Referring to FIG. 5F, the key concept extractor 590 may include key concepts which are identified, such as clustering algorithms, entity/action/event extraction, interplay between themes and knowledge graphs, deep learning to extract causal patterns, themes which are being tracked (deductive and inductive concepts) and which emerge out of a dataset, emotional emphasis provide to transcribed text, known key concepts and patterns expressed in a database, etc. The concept layout 591 may include a 3D model 592 which includes an X/Y axis to demonstrate semantic similarities, a Z axis to demonstrate an element of time, interest, importance, etc. A deductive model 593 may illustrate an organization of themes (collection of articles) and other information in a structured shape or grid, the articles may be organized into themes and an overlay signal (e.g., sentiment, activity, risk, etc.) can be placed on top of the themes. This enables seamless zooming into the theme(s) down to individual graphs and zooming out to see an organization of the theme as a collection of issues. Another realization approach is an inductive graph 594, which may map articles by similarity, display key concepts as clusters with a maximum weight of the articles, display distinctive text (font, color, size, etc.) at a center of a weight of the articles/paragraphs/statements which are relevant to a theme.

Figure 6A:
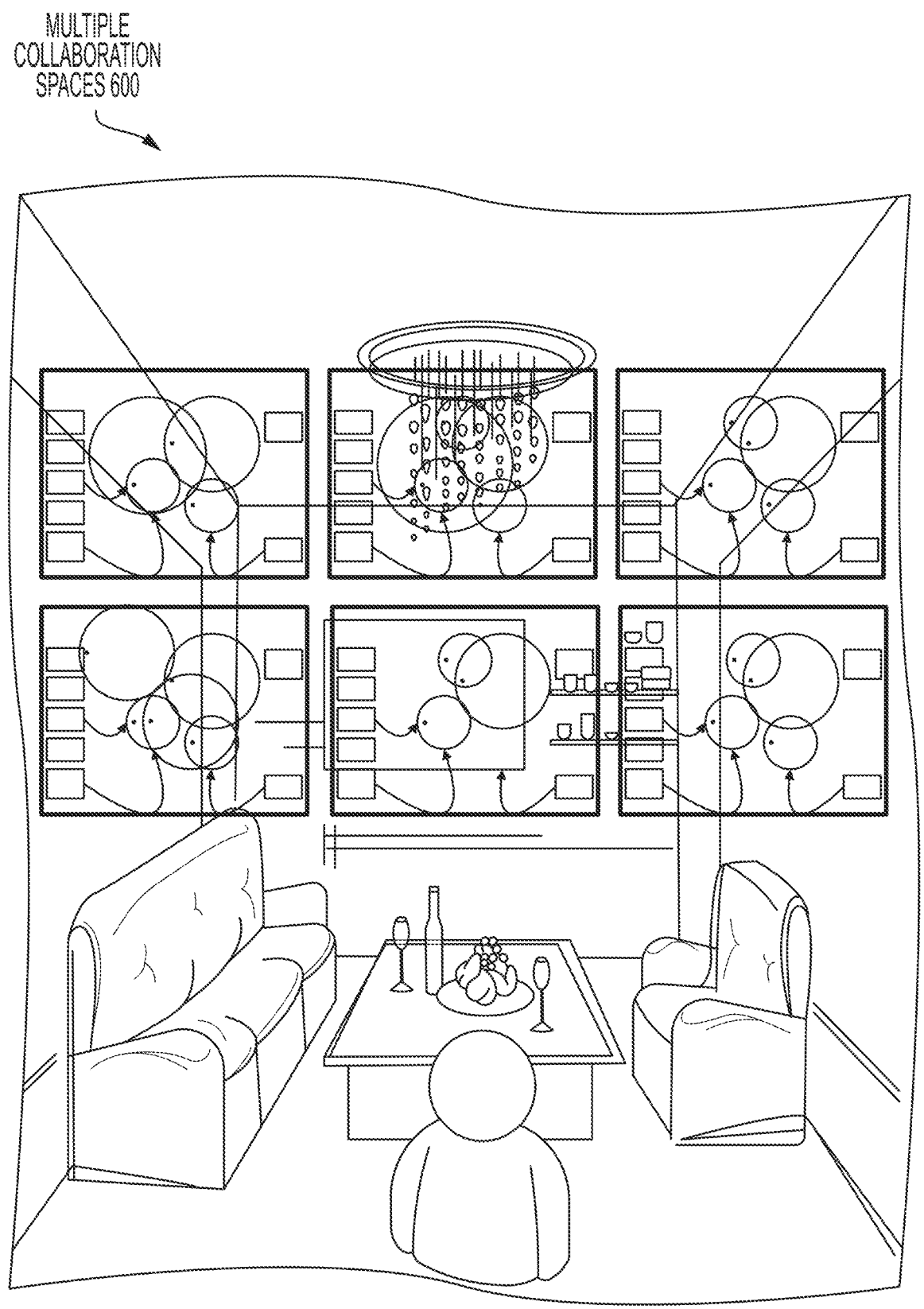
FIG. 6A illustrates an example multi-collaboration virtual space according to example embodiments.

FIG. 6A illustrates an example multi-collaboration virtual space according to example embodiments. Referring to FIG. 6A, the example of multiple collaboration spaces 600 may include a user wearing a computing headset or computing glasses or contact lenses and other types of peripheral devices, that enable an AR view of content to be displayed in an area where the user is facing. Each collaboration space may be unique and may be modified by additional inputs by other uses sharing the collaboration space(s) and by AI application resources which are attempting to identify additional content. The collaboration spaces may be stacked, overlayed, and represented with different borders or transparency levels to indicate salience or some other attribute. The spaces may also be resized, rotated, and repositioned in any plane. Collaboration and information spaces can leverage the power of AR/VR in many ways, including displaying the information as a 3/4-dimensional object. The object can also evolve over time, based on the collaboration, additional web sources, new information, etc.

Figure 6B:
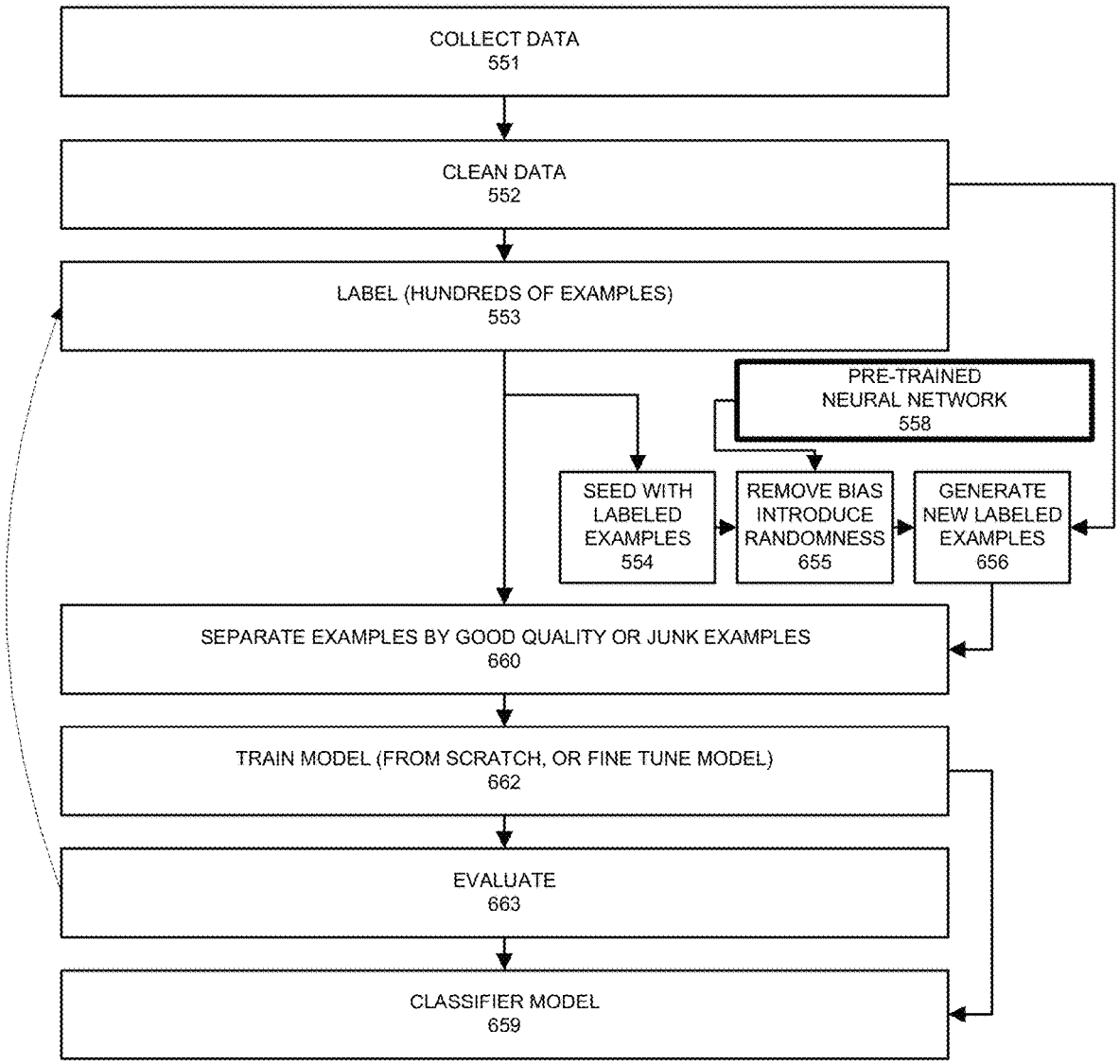
FIG. 6B illustrates another example data management process for performing generative labeling according to example embodiments.

FIG. 6B illustrates another example data management process for performing generative labeling according to example embodiments. Referring to FIG. 6B, the process is similar to FIG. 5B, however, there are certain differences in this example as to how the data is managed and used to create generative labeling. Certain examples may include identifying hundreds of examples (553) to label, such as a sentence, paragraph or document level, an image, feature of an image, sound, numerical series, etc., to build labels to identify specific relevancy. Classes (topics or signals) can be identified and labeled. For example, 'climate risk' is a label (signal) that can be identified as having increased in 'a piece of text about Ghana', and the signal of an increase in 'climate risk' may be identified as having decreased in 'a piece of text about Kenya'. Classes are the basis for labels, and sentiments or direction can also be identified, as more positive or more negative attributes of a label. All statements are established for some sort of class (topic or signal). The pre-trained neural network, which is trained on a large collection of text, images, etc. which can, as a non-limiting example be filtered to an objective such as "a collection of climate change research" to fine-tuning the model with, for example, labeling keyword matched examples "everything we know about climate change" (553). This model is fine-tuned with the several hundred examples to remove any bias from the pre-trained text (655). The fine-tuned model may create newly labeled data (656). The labeled examples can be separated into a junk class (low certainty generated results (text, images, etc.) by the fine-tuned model) and non-junk (660). The labeled data can be used to fine-tune a new (larger) model or classifier (662) based on some specific criteria, which results in a classifier model (659). This process can loop back to curate the manual labels (553) from the evaluation 663.

Figure 7:
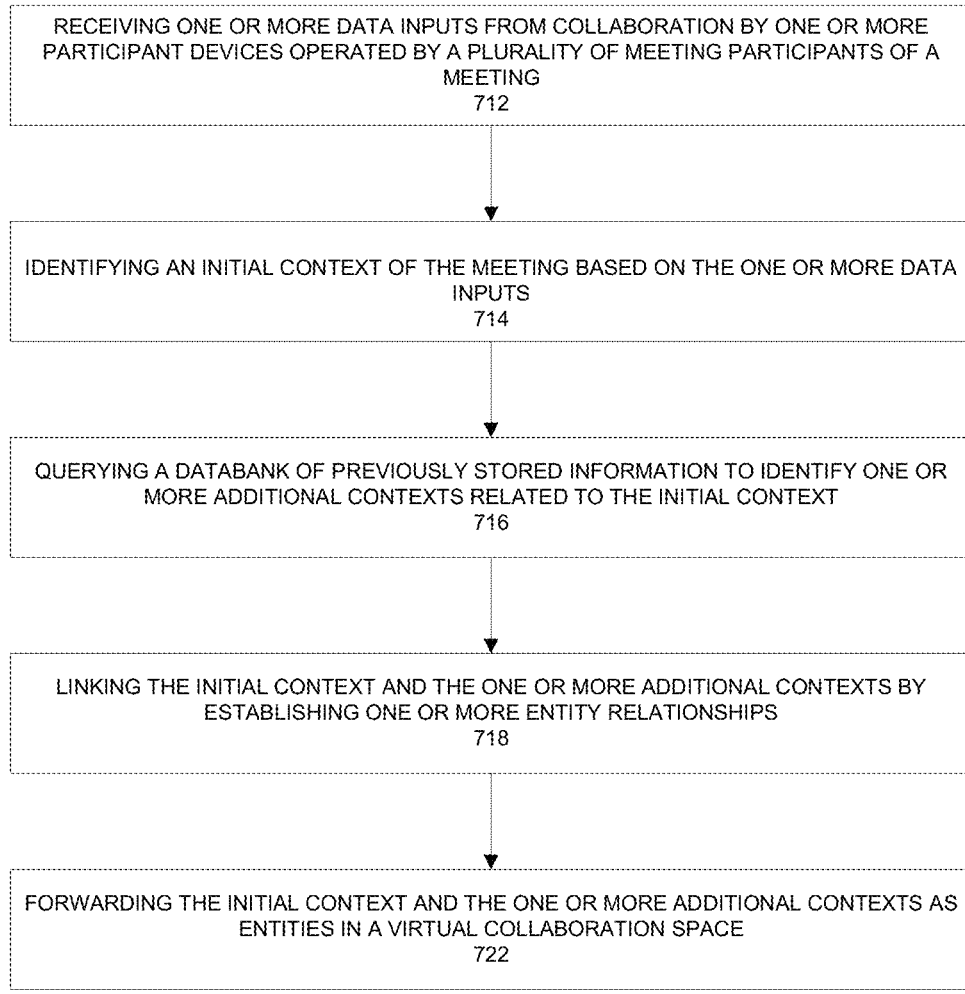
FIG. 7 illustrates a flow diagram of an example method of operation according to example embodiments.

FIG. 7 illustrates a flow diagram of an example method of operation according to example embodiments. Referring to FIG. 7, the AI application function may identify meeting a topic focus, provide an initial context and populate a virtual collaboration environment with visual data. The initial context may evolve into additional contexts over time depending on the information that is provided to the meeting application. The process may include receiving one or more data inputs from collaboration by one or more participant devices operated by a plurality of meeting participants of a meeting 712, identifying an initial context of the meeting based on the one or more data inputs 714. The initial context may be extracted by the AI function, which utilizes the input data to identify additional content from various sources. The process may also include querying a databank of previously stored information to identify one or more additional contexts related to the initial context 716, this may include referencing content from a previous meeting and including relevant information in the current meeting based on the initial context identified from the user input. The process may also include linking the initial context and the one or more additional contexts by establishing one or more entity relationships 718. The linking may include a visualization of a relationship, such as a line between two entities, an arrow, or other indicia to provide a visualization of the relationship between entities as they are introduced in the collaboration area. The process may also include forwarding the initial context and the one or more additional contexts as entities in a virtual collaboration space 722 so all users can share the information space. The user may be able to manipulate the context that the AI has generated. One example may be a purpose behind the topic, such as "Today we will discuss the economic implications of the plan". This is instead of just the plan itself being presented.

The process may also include identifying an initial context of the meeting further includes parsing terms and phrases from one or more of shared documents and recorded conversations, selecting one or more potential contexts from the parsed terms and phrases, comparing the selected one or more contexts to one or more previous meeting contexts, and identifying the selected one or more contexts matches the one or more previous meeting contexts. The process may also include identifying an initial context of the meeting further includes parsing terms and phrases from one or more of shared documents, recorded conversations and selecting one or more potential contexts from the parsed terms and phrases, identifying one or more instances of sentiment recorded from the one or more of the plurality of meeting participants, and identifying the selected one or more contexts is confirmed based on the one or more instances of sentiment. The process may also include querying a databank of previously stored information to identify one or more additional contexts related to the initial context includes identifying one or more preferences specifying information sources to use for the collaboration, and querying the databank for the previously stored information that is in compliance with the one or more preferences.

The process may also include linking the initial context and the one or more additional contexts includes storing the one or more additional contexts as sub-contexts to the initial context and establishing the one or more entity relationships includes creating an illustration of entities which are connected by line illustrations. The entities may be weighted to modify the presentation of the data. The process may also include creating a first collaborative space as a portion of the virtual collaboration space, and forwarding the initial context and the one or more additional contexts as entities in the first collaborative space, and creating a second collaborative space to store one or more remote information source contexts identified from a remote information source outside of the databank, wherein the one or more remote information sources provide data sources which are related to the initial context. The process may also include identifying one or more instances of negative sentiment recorded from the one or more of the plurality of meeting participant, identifying the one or more remote information source contexts are not confirmed based on the one or more instances of negative sentiment, and removing the one or more remote information source contexts.

Figure 8:
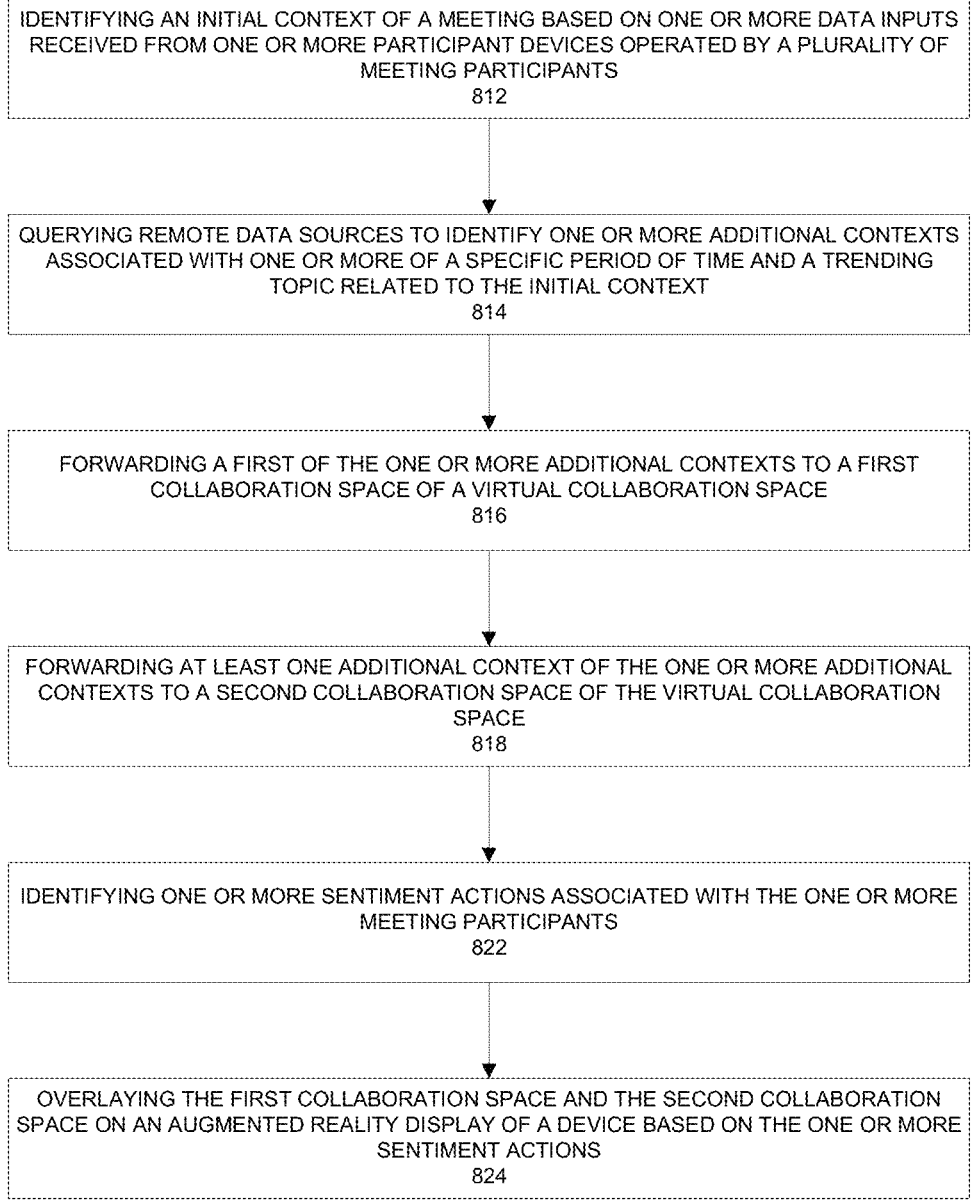
FIG. 8 illustrates a flow diagram of another example method of operation according to example embodiments.

FIG. 8 illustrates a flow diagram of another example method of operation according to example embodiments. The example may include providing numerous multi-source and multi-result buckets based on a single context and applying user response feedback to create the context results. Also, the VR/AR may be used to provide the collaboration spaces. The example may include identifying an initial context of a meeting based on one or more data inputs received from one or more participant devices operated by a plurality of meeting participants 812, querying remote data sources to identify one or more additional contexts associated with one or more of a specific period of time and a trending topic related to the initial context 814, forwarding a first of the one or more additional contexts to a first collaboration space of a virtual collaboration space 816, forwarding at least one additional context of the one or more additional contexts to a second collaboration space of the virtual collaboration space 818, identifying one or more sentiment actions associated with the one or more meeting participants 822, and overlaying the first collaboration space and the second collaboration space on an augmented reality display of a device based on the one or more sentiment actions 824.

The process may also include identifying the one or more sentiment actions include one or more of detecting movement of the one or more meeting participants. The first of the one or more additional contexts may be identified as having a greater relevancy score than a relevancy score of the second of the one or more additional contexts. The process may also include overlaying the first collaboration space and the second collaboration space on the augmented reality display of the device based on the one or more sentiment actions comprises prioritizing a position of the first collaboration space in the augmented reality display over a position of the second collaboration space in the augmented reality space based on the one or more sentiment actions. The one or more sentiment actions comprise an agreeable sentiment includes one or more of a spoken term, a movement of the head, a movement of the eyes, and a hand gesture identified from the one or more meeting participants, and the agreeable sentiment confirms the prioritization of the position of the first collaboration space in the augmented reality display. The agreeable sentiment includes a confirmed focus by the one or more meeting participants to the first collaboration space based on the one or more sentiment actions being performed to the first collaboration space for a threshold period of time. After the agreeable sentiment has been detected for the threshold period of time, the first collaboration space is assigned a highest priority.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 9:
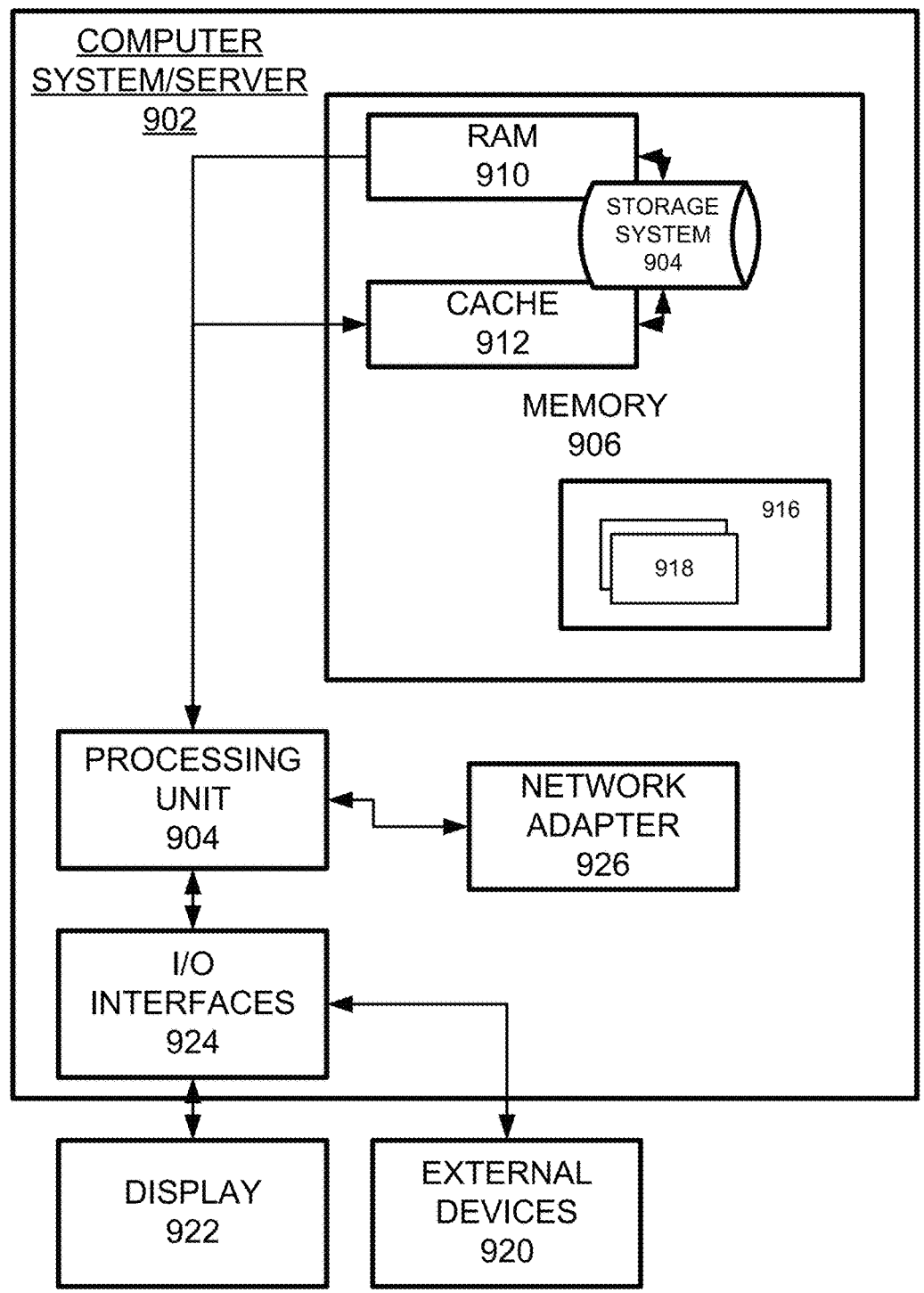
FIG. 9 illustrates a computer system configuration configured to compute one or more test operations according to example embodiments.

FIG. 9 is not intended to suggest any limitation as to the scope of use or functionality of embodiments of the application described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 9, computer system/server 902 in cloud computing node 900 is displayed in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not displayed, other hardware and/or software components could be used in conjunction with computer system/server 902. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
identifying an initial context of a meeting based on one or more data inputs received from one or more participant devices operated by a plurality of meeting participants;
querying remote data sources to identify one or more additional contexts associated with one or more of a specific period of time and a trending topic related to the initial context;
forwarding a first of the one or more additional contexts to a first collaboration space of a virtual collaboration space;
forwarding at least one additional context of the one or more additional contexts to a second collaboration space of the virtual collaboration space;
applying one or more sentiment actions associated with the one or more meeting participants to information associated with the one or more additional contexts and the at least one additional context to determine the information should be included in the virtual collaboration space; and
overlaying the first collaboration space and the second collaboration space on an augmented reality display of a device based on the one or more sentiment actions identifying a location area the information should be placed in the virtual collaboration space.

2. The method of claim 1, wherein identifying the one or more sentiment actions comprise one or more of detecting movement of the one or more meeting participants.

3. The method of claim 1, wherein the first of the one or more additional contexts is identified as having a greater relevancy score than a relevancy score of the second of the one or more additional contexts.

4. The method of claim 1, wherein overlaying the first collaboration space and the second collaboration space on the augmented reality display of the device based on the one or more sentiment actions comprises prioritizing a position of the first collaboration space in the augmented reality display over a position of the second collaboration space in the augmented reality space based on the one or more sentiment actions.

5. The method of claim 4, wherein the one or more sentiment actions comprise an agreeable sentiment comprising one or more of a spoken term, a movement of the head, a movement of the eyes, and a hand gesture identified from the one or more meeting participants, and wherein the agreeable sentiment confirms the prioritization of the position of the first collaboration space in the augmented reality display.

6. The method of claim 5, wherein the agreeable sentiment comprises a confirmed focus by the one or more meeting participants to the first collaboration space based on the one or more sentiment actions being performed to the first collaboration space for a threshold period of time.

7. The method of claim 6, wherein after the agreeable sentiment has been detected for the threshold period of time, the first collaboration space is assigned a highest priority.

8. An apparatus comprising
a processor configured to
identify an initial context of a meeting based on one or more data inputs received from one or more participant devices operated by a plurality of meeting participants;
query remote data sources to identify one or more additional contexts associated with one or more of a specific period of time and a trending topic related to the initial context;
forward a first of the one or more additional contexts to a first collaboration space of a virtual collaboration space;
forward at least one additional context of the one or more additional contexts to a second collaboration space of the virtual collaboration space;
apply one or more sentiment actions associated with the one or more meeting participants to information associated with the one or more additional contexts and the at least one additional context to determine the information should be included in the virtual collaboration space; and
overlay the first collaboration space and the second collaboration space on an augmented reality display of a device based on the one or more sentiment actions being interpreted to identify a location area the information should be placed in the virtual collaboration space.

9. The apparatus of claim 8, wherein the identification of the one or more sentiment actions comprise one or more of the processor being configured to detect movement of the one or more meeting participants.

10. The apparatus of claim 8, wherein the first of the one or more additional contexts is identified as having a greater relevancy score than a relevancy score of the second of the one or more additional contexts.

11. The apparatus of claim 8, wherein the overlay of the first collaboration space and the second collaboration space on the augmented reality display of the device based on the one or more sentiment actions comprises the processor being configured to prioritize a position of the first collaboration space in the augmented reality display over a position of the second collaboration space in the augmented reality space based on the one or more sentiment actions.

12. The apparatus of claim 11, wherein the one or more sentiment actions comprise an agreeable sentiment comprising one or more of a spoken term, a movement of the head, a movement of the eyes, and a hand gesture identified from the one or more meeting participants, and wherein the agreeable sentiment confirms the prioritization of the position of the first collaboration space in the augmented reality display.

13. The apparatus of claim 12, wherein the agreeable sentiment comprises a confirmed focus by the one or more meeting participants to the first collaboration space based on the one or more sentiment actions being performed to the first collaboration space for a threshold period of time.

14. The apparatus of claim 13, wherein after the agreeable sentiment has been detected for the threshold period of time, the first collaboration space is assigned a highest priority.

15. A non-transitory computer readable storage medium configured to store instructions that when executed cause a processor to perform:
identifying an initial context of a meeting based on one or more data inputs received from one or more participant devices operated by a plurality of meeting participants;
querying remote data sources to identify one or more additional contexts associated with one or more of a specific period of time and a trending topic related to the initial context;
forwarding a first of the one or more additional contexts to a first collaboration space of a virtual collaboration space;
forwarding at least one additional context of the one or more additional contexts to a second collaboration space of the virtual collaboration space;

applying one or more sentiment actions associated with the one or more meeting participants to information associated with the one or more additional contexts and the at least one additional context to determine the information should be included in the virtual collaboration space; and overlaying the first collaboration space and the second collaboration space on an augmented reality display of a device based on the one or more sentiment actions identifying a location area the information should be placed in the virtual collaboration space.

16. The non-transitory computer readable storage medium of claim 15, wherein identifying the one or more sentiment actions comprise one or more of detecting movement of the one or more meeting participants.

17. The non-transitory computer readable storage medium of claim 15, wherein the first of the one or more additional contexts is identified as having a greater relevancy score than a relevancy score of the second of the one or more additional contexts.

18. The non-transitory computer readable storage medium of claim 15, wherein overlaying the first collaboration space and the second collaboration space on the augmented reality display of the device based on the one or more sentiment actions comprises prioritizing a position of the first collaboration space in the augmented reality display over a position of the second collaboration space in the augmented reality space based on the one or more sentiment actions.

19. The non-transitory computer readable storage medium of claim 18, wherein the one or more sentiment actions comprise an agreeable sentiment comprising one or more of a spoken term, a movement of the head, a movement of the eyes, and a hand gesture identified from the one or more meeting participants, and wherein the agreeable sentiment confirms the prioritization of the position of the first collaboration space in the augmented reality display.

20. The non-transitory computer readable storage medium of claim 19, wherein the agreeable sentiment comprises a confirmed focus by the one or more meeting participants to the first collaboration space based on the one or more sentiment actions being performed to the first collaboration space for a threshold period of time.

\* \* \* \* \*